US012320182B2

(12) United States Patent
Fiset et al.

(10) Patent No.: US 12,320,182 B2
(45) Date of Patent: Jun. 3, 2025

(54) FENESTRATION UNIT WITH TWO-PART FRAME

(71) Applicant: JELD-WEN, Inc., Charlotte, NC (US)

(72) Inventors: Dominique Fiset, Neuville (CA); Frederic Renaud, Lévis (CA); Sylvain Lacasse, Québec (CA); Miguel Fortin, Québec (CA); Lisa Bergeron, Lévis (CA); Jeff Pigeon, Peterborough (CA)

(73) Assignee: JELD-WEN, Inc.

( * ) Notice: Subject to any disclaimer, the term of this patent is extended or adjusted under 35 U.S.C. 154(b) by 196 days.

(21) Appl. No.: 17/811,768

(22) Filed: Jul. 11, 2022

(65) Prior Publication Data

US 2024/0011347 A1 Jan. 11, 2024

(51) Int. Cl.
*E06B 3/00* (2006.01)
*E06B 1/36* (2006.01)
*E06B 3/26* (2006.01)
*E06B 3/36* (2006.01)

(52) U.S. Cl.
CPC .................. *E06B 3/26* (2013.01); *E06B 1/36* (2013.01); *E06B 3/36* (2013.01)

(58) Field of Classification Search
CPC ................. E06B 3/26; E06B 1/36; E06B 3/36
See application file for complete search history.

(56) References Cited

U.S. PATENT DOCUMENTS 5,115,610 A * 5/1992 Kessler ................. E06B 3/5842 D25/124
5,560,149 A * 10/1996 Lafevre ..................... E06B 3/56 49/404
5,699,845 A * 12/1997 Jelic ......................... E06B 9/264 160/176.1 R
6,467,226 B2 * 10/2002 Dodson ................. E06B 3/5892 52/211
6,807,778 B2 * 10/2004 Engebretson ........... E06B 1/345 52/204.59
8,109,052 B2 * 2/2012 Rosende ............... E06B 1/6015 52/204.55
12,012,799 B2 * 6/2024 Salvoni ................... E06B 1/702
2008/0001413 A1 * 1/2008 Lake .......................... E05C 9/22 292/138
2015/0184684 A1 * 7/2015 Lathief ................. E06B 3/5871 403/330
2016/0186484 A1 * 6/2016 Nielsen ..................... E06B 3/44 49/458
2020/0386038 A1 * 12/2020 Salentine .............. E06B 3/5828

OTHER PUBLICATIONS

Illustration of casement cross-section available on Jan. 6, 2009.
Photograph of casement cross-section available on Mar. 17, 2017.

* cited by examiner

*Primary Examiner* — Basil S Katcheves
(74) *Attorney, Agent, or Firm* — Lorenz & Kopf LLP

(57) ABSTRACT

A fenestration unit includes a sash configured to receive a glazing unit, and a frame. The frame includes a plurality of walls configured to support the sash. A first wall of the plurality of walls includes a cover coupling portion having a first cantilevered coupling wall spaced apart from a second cantilevered coupling wall. The frame includes an access cover defining at least one tab configured to releasably engage with at least one of the first cantilevered coupling wall and the second cantilevered coupling wall.

8 Claims, 10 Drawing Sheets

FENESTRATION UNIT WITH TWO-PART FRAME

TECHNICAL FIELD

The present disclosure generally relates to fenestration units, and more particularly relates to a fenestration unit, such as a casement window, having a two-part frame.

BACKGROUND

A fenestration unit, such as a window, may include a frame that supports one or more other components of the unit. For example, the fenestration unit may include a frame that includes a sash that supports a glazing unit. In certain instances, the fenestration unit may include one or more mechanical components, which are coupled to the frame to enable relative movement between components of the fenestration unit (for example, a movement of the sash and the glazing unit relative to the frame). During the life of the fenestration unit, it is desirable to access the mechanical components to service the mechanical components, for example. Generally, in order to access to the mechanical components, the sash and the glazing unit may be removed from the frame. The removal of the sash and the glazing unit, however, is time consuming, and in certain instances, may require the use of scaffolding, ladders, etc. to access an exterior side of the fenestration unit.

Accordingly, it is desirable to provide a fenestration unit with a two-part frame, which provides access to the mechanical components associated with the fenestration unit without requiring removal of the sash or glazing unit. Further, it is desirable to provide a fenestration unit with a two-part frame that provides access to the mechanical components associated with the fenestration unit from an interior side of the fenestration unit. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a fenestration unit. The fenestration unit includes a sash configured to receive a glazing unit, and a frame. The frame includes a plurality of walls configured to support the sash. A first wall of the plurality of walls includes a cover coupling portion having a first cantilevered coupling wall spaced apart from a second cantilevered coupling wall. The frame includes an access cover defining at least one tab configured to releasably engage with at least one of the first cantilevered coupling wall and the second cantilevered coupling wall.

The at least one tab of the access cover comprises a first tab opposite a second tab, the first tab configured to releasably engage with the first cantilevered coupling wall and the second tab configured to releasably engage with the second cantilevered coupling wall. The first cantilevered coupling wall includes a keyed rail at an end, which is configured to engaged with a notch defined on the access cover proximate the first tab. The second cantilevered coupling wall includes a rail at an end, which is configured to engaged with a groove defined on the access cover proximate the second tab. The first cantilevered coupling wall includes a projection, and the at least one tab of the access cover is configured to be retained by the projection. The access cover defines at least one channel configured to receive a screen assembly associated with the fenestration unit. The sash defines a channel configured to receive the glazing unit, with a first stop coupled to a first side of the channel and a second stop coupled to a second side of the channel, and the second stop is removable. The access cover further comprises a seal positioned between the second stop and the access cover. The second stop is coupled to the sash to be proximate the access cover. The fenestration unit is a casement window. The cover coupling portion extends along a first axis and the at least one tab extends along a second axis, which is oblique to the first axis. The access cover cooperates with the first wall to define a chamber configured to receive a mechanical system associated with the fenestration unit.

Further provided is a fenestration unit. The fenestration unit includes a sash configured to receive a glazing unit, and a frame. The frame includes a plurality of walls configured to support the sash. A first wall of the plurality of walls includes a cover coupling portion that extends along a first axis. The cover coupling portion has a first cantilevered coupling wall spaced apart from a second cantilevered coupling wall. The frame includes an access cover defining at least one tab configured to releasably engage with at least one of the first cantilevered coupling wall and the second cantilevered coupling wall, and the at least one tab extends along a second axis that is oblique to the first axis.

The at least one tab of the access cover comprises a first tab opposite a second tab, the first tab extends along the second axis, the first tab configured to releasably engage with the first cantilevered coupling wall and the second tab configured to releasably engage with the second cantilevered coupling wall. The first cantilevered coupling wall includes a keyed rail at an end, which is configured to engaged with a notch defined on the access cover proximate the first tab. The second cantilevered coupling wall includes a rail at an end, which is configured to engaged with a groove defined on the access cover proximate the second tab. The second tab extends along a third axis, the third axis different than the second axis, and the third axis is oblique to the first axis. The access cover defines at least one channel configured to receive a screen assembly associated with the fenestration unit. The sash defines a channel configured to receive the glazing unit, with a first stop coupled to a first side of the channel and a second stop coupled to a second side of the channel to be proximate the access cover, the second stop removable from the sash, and the access cover further comprises a seal positioned between the second stop and the access cover. The access cover cooperates with the first wall to define a chamber configured to receive a mechanical system associated with the fenestration unit.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of fenestration unit that would benefit from a two-part frame and the use of the two-part frame in a casement window described herein is merely one exemplary embodiment according to the present disclosure. In addition, while the two-part frame is described herein as being formed as an extrusion, the various teachings of the present disclosure can be used with frames formed through other manufacturing techniques. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. Also, as used herein, the term "about" denotes within 10% to account for manufacturing tolerances.

Figure 1:
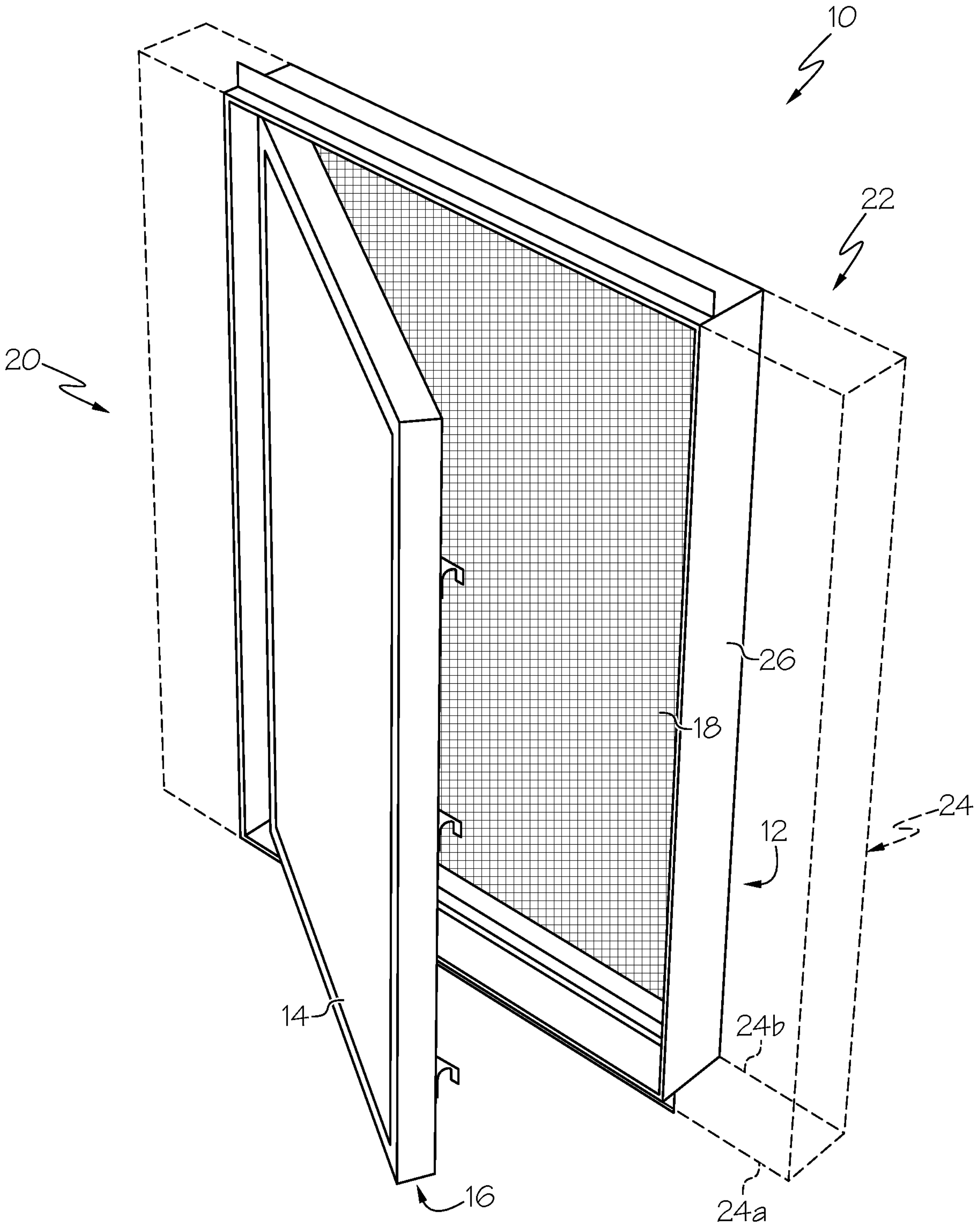
FIG. 1 is a schematic perspective illustration of a fenestration unit, such as a casement window, which includes an exemplary two-part frame in accordance with the various teachings of the present disclosure.

With reference to FIG. 1, a fenestration system or fenestration unit 10 including a two-part frame or frame 12 is shown. In this example, the fenestration unit 10 is a window, such as a casement window. It should be noted, however, that the teachings discussed herein may be applicable to other types of fenestration units, including, but not limited to hung windows, awnings, horizontal sliding windows, horizontal sliding doors, etc. As will be discussed, a glazing unit 14 of the fenestration unit 10 is supported by a sash 16, and the sash 16 is movable or pivotable relative to the frame 12 to enable the ingress and/or egress of fluids, such as air, through the fenestration unit 10. Generally, the sash 16 is movable or pivotable relative to the frame 12 from a closed position (FIG. 2) to various opened positions in which the glazing unit 14 is spaced apart from the frame 12. The sash 16 is shown in the opened position in FIG. 1. In this example, the fenestration unit 10 also includes a screen 18, which assists in inhibiting insects, etc. from entering into the fenestration unit 10 when in the opened position. The fenestration unit 10 has a first, exterior side 20 and an opposite second, interior side 22. When the fenestration unit 10 is coupled to a structure, such as a building 24, the exterior side 20 is disposed on an exterior 24*a* of the building 24, while the interior side 22 is disposed in an interior 24*b* of the building 24 (see also FIG. 2). As will be discussed, with reference to FIG. 2, the frame 12 enables an operator to access a portion of a mechanical system 26 associated with the frame 12 from the interior 24*b* of the building 24, which provides for ease of access.

Figure 2:
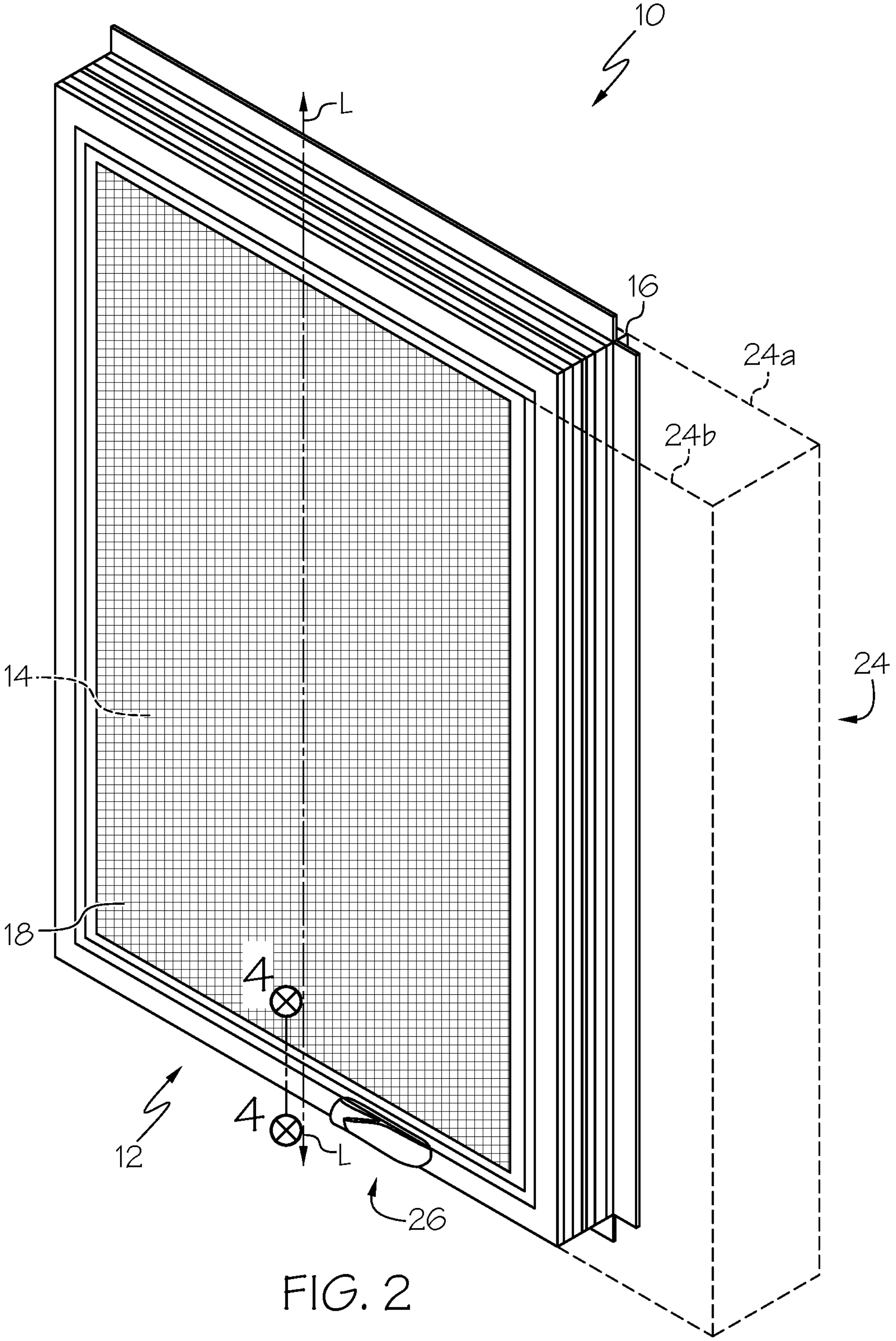
FIG. 2 is a perspective back or interior view of the fenestration unit or casement window of FIG. 1, which includes the exemplary two-part frame in accordance with various embodiments.
Figure 3:
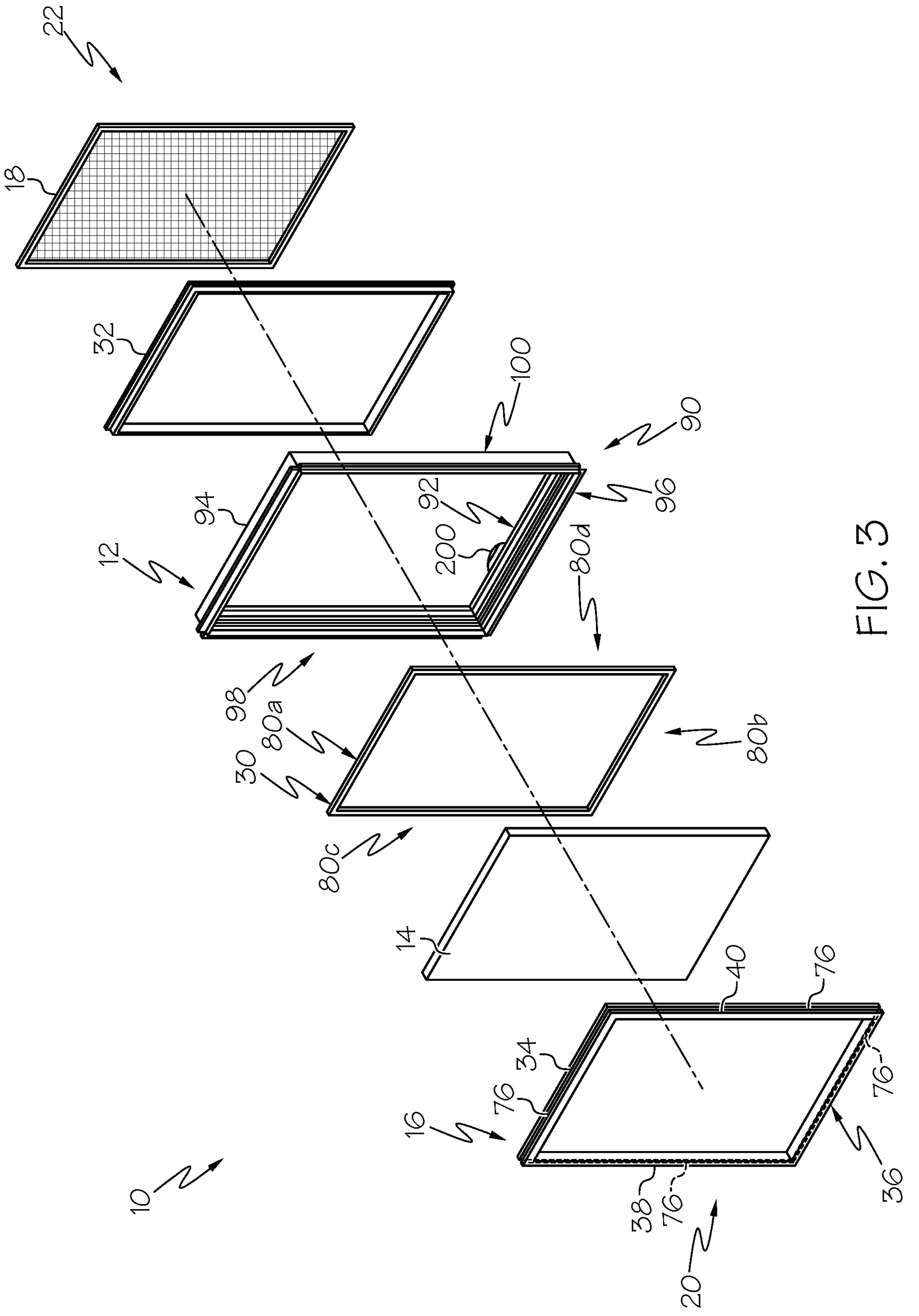
FIG. 3 is a front partially exploded view of the fenestration unit.

With reference to FIG. 3, an exploded view of the fenestration unit 10 is shown. In this example, the fenestration unit 10 includes the sash 16, the glazing unit 14, a first seal 30, the frame 12, a screen frame 32 and the screen 18. The screen frame 32 and the screen 18 cooperate to form a screen assembly. The glazing unit 14 comprises any suitable glazing unit for a casement window, including, but not limited to a single pane of glass, an insulated double-pane glazing unit, tri-pane glazing unit, or any suitable multi-pane glazing unit. The fenestration unit 10 generally extends along a longitudinal axis L (FIG. 2). The sash 16 is on the exterior side 20 of the fenestration unit 10. In one example, the sash 16 is rectangular and includes a first sash wall 34 opposite a second sash wall 36, and a third sash wall 38 opposite a fourth sash wall 40. Each of the first sash wall 34, the second sash wall 36, the third sash wall 38 and the fourth sash wall 40 are composed of a polymer-based material, including, but not limited to polyvinyl chloride. In this example, each of the first sash wall 34, the second sash wall 36, the third sash wall 38 and the fourth sash wall 40 are extruded, and are coupled together, via suitable mechanical fasteners, such as screws, bolts, etc. and/or adhesives to form the rectangular sash 16.

Figure 4A:
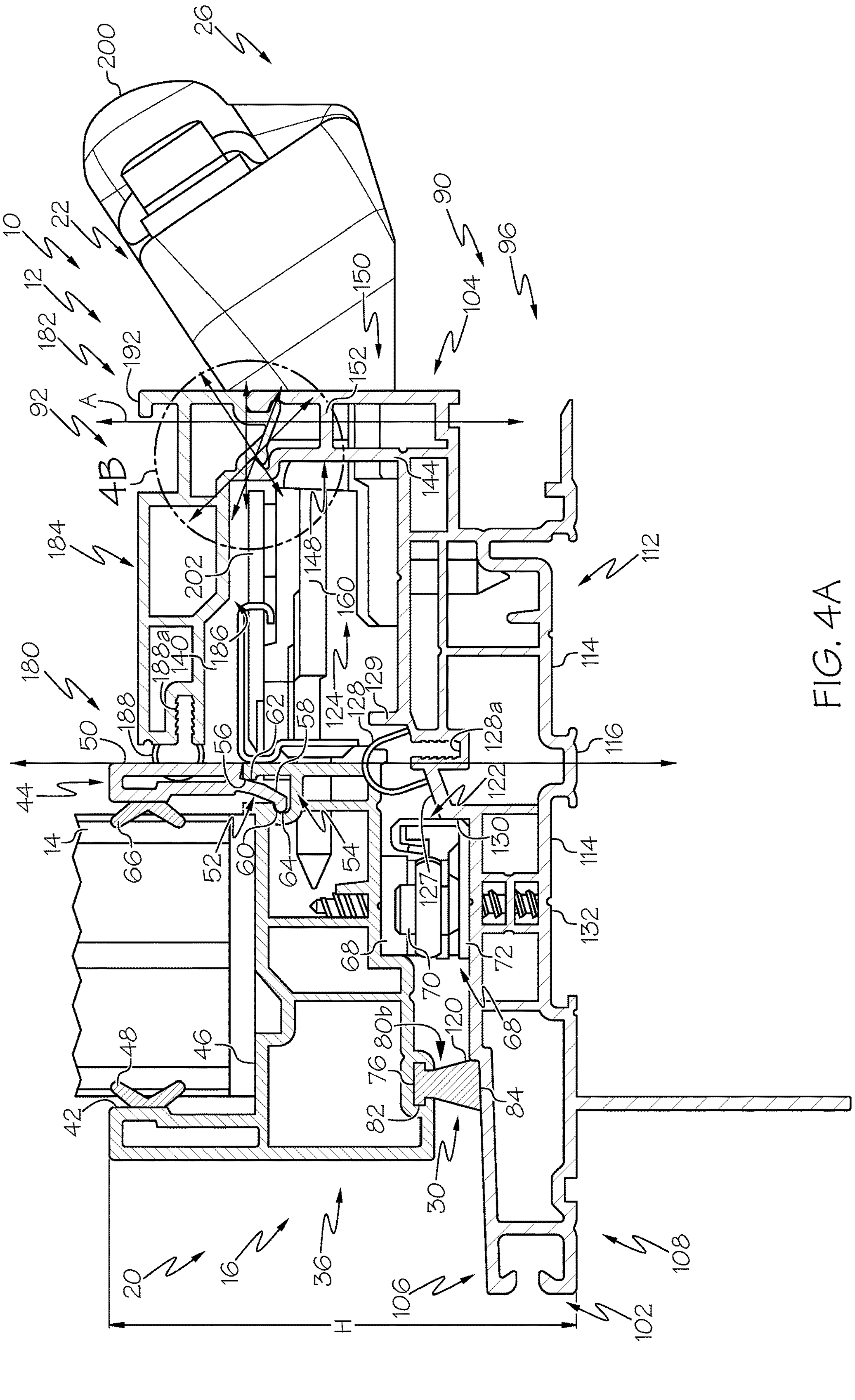
FIG. 4A is a cross-sectional view of the fenestration unit, taken along line 4-4 of FIG. 2, which illustrates an access cover or operator access cover coupled to a sill wall that jointly form the two-part frame.
Figure 4B:
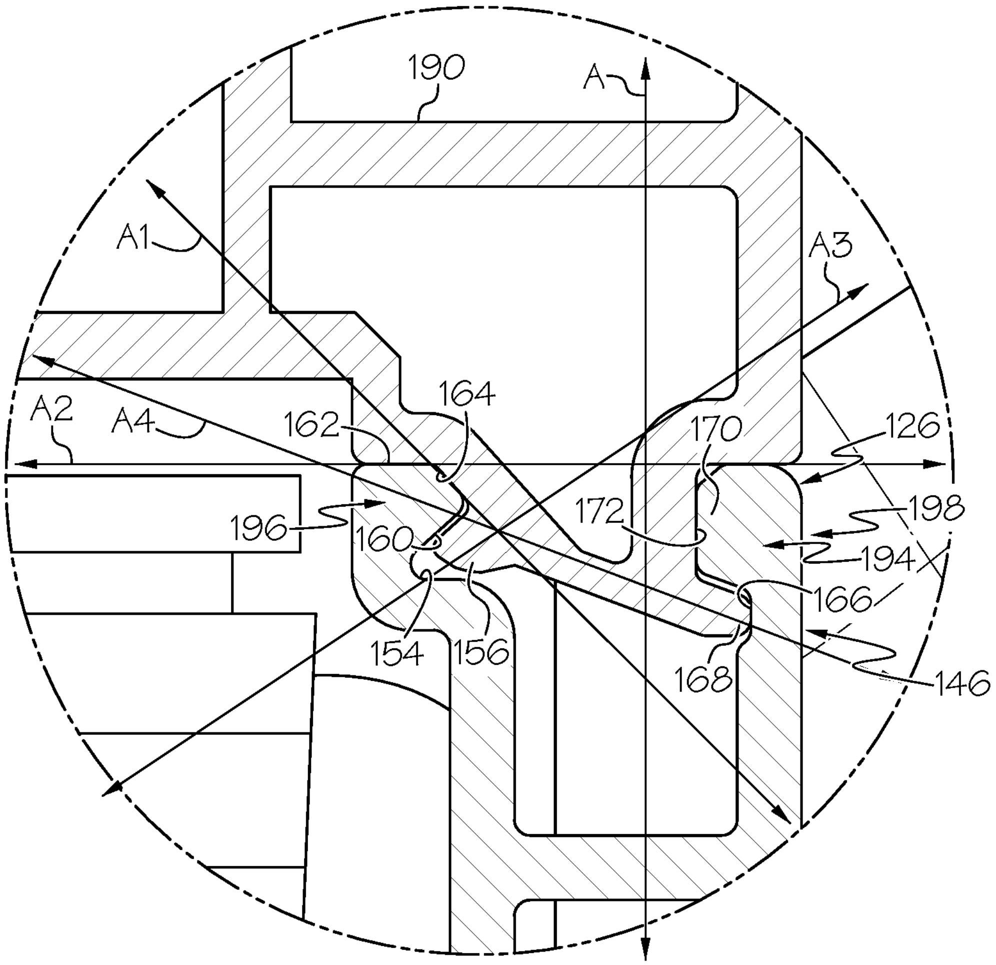
FIG. 4B is a detail cross-sectional view taken at 4B of FIG. 4A.

With reference to FIGS. 4A and 4B, a cross-section taken through the second sash wall 36 of the fenestration unit 10 is shown. Each of the first sash wall 34, the second sash wall 36, the third sash wall 38 and the fourth sash wall 40 includes an integrally formed first stop 42. The first stop 42 extends outwardly from the respective one of the first sash wall 34, the second sash wall 36, the third sash wall 38 and the fourth sash wall 40, and cooperates with a second stop 44 to define a glazing unit channel 46. The first stop 42 is integrally formed with a first side of the glazing unit channel 46, and the second stop 44 is coupled to a second side of the glazing unit channel 46. The glazing unit channel 46 is configured to receive the glazing unit 14 and to retain the glazing unit 14 within the sash 16. In one example, a first glazing unit sealing member 48 is coupled to the first stop 42, and assists in inhibiting fluids, such as water, etc., from entering into the glazing unit channel 46.

Generally, each of the first sash wall 34, the second sash wall 36, the third sash wall 38 and the fourth sash wall 40 includes a respective one of the second stop 44. In one example, the second stop 44 is composed of a polymeric material, including, but not limited to polyvinyl chloride, and is extruded. A respective second stop 44 is removably coupled to each of the first sash wall 34, the second sash wall 36, the third sash wall 38 and the fourth sash wall 40 to enable the glazing unit 14 to be removed for repair, for example, without removing the entirety of the fenestration unit 10. Each second stop 44 includes a body portion 50 and an interlocking stop tab 52. The body portion 50 is generally elongate and hollow, and is integrally formed with the interlocking stop tab 52. The interlocking stop tab 52 is cantilevered or extends outwardly from the body portion 50, and is received within a sash tab groove 54 of the sash 16. The interlocking stop tab 52 includes a first contact surface 56, a ramp surface 58 and a second contact surface or projection 60. The first contact surface 56 is defined on the interlocking stop tab 52 proximate the body portion 50, and is coupled to or in contact with a lip 62 of the sash tab groove 54. The ramp surface 58 extends from the first contact surface 56 to the projection 60. The ramp surface 58 extends along an axis oblique to the longitudinal axis L, and biases the interlocking stop tab 52 within the sash tab groove 54. The projection 60 engages with a corresponding slot 64 of the sash tab groove 54 to couple the second stop 44 to the sash 16. Generally, in order to remove the second stop 44 to access the glazing unit 14, the body portion 50 of the second stop 44 is moved counterclockwise toward the glazing unit 14 to release the ramp surface 58 and thereby disengage the projection 60 with the slot 64, and the first contact surface 56 with the lip 62.

In one example, a second glazing unit sealing member 66 is coupled to the body portion 50 of the second stop 44 and is positioned between the second stop 44 and the glazing unit 14 when the second stop 44 is coupled to the sash 16. The second glazing unit sealing member 66 assists in inhibiting fluids, such as water, etc., from entering into the glazing unit channel 46. The first glazing unit sealing member 48 and the second glazing unit sealing member 66 may be composed of a polymeric material, such an elastomeric material, rubber, etc., and may be formed by extruding, molding, etc.

The sash 16 is movable or pivotable relative to the frame 12 to move the glazing unit 14 relative to the frame 12. The sash 16 may include any suitable components to enable the pivotal movement of the sash 16 relative to the frame 12, including, but not limited to linkage arms, pivot pins, etc. For example, the second sash wall 36 may include a linkage assembly 68, which is coupled to the second sash wall 36 so as to be opposite the glazing unit channel 46. Generally, the linkage assembly 68 includes a first link 70 coupled to the second sash wall 36, and a second link 72 coupled to the frame 12. A link pin 74 couples the first link 70 to the second link 72. The linkage assembly 68 serves to guide the motion of the sash 16 as it moves relative to the frame 12. The first sash wall 34 may include a pivot pin or the like to further support the sash 16 for pivotable movement relative to the frame 12. The sash 16 may also include one or more locking tabs to secure the sash 16 to the frame 12 when the sash 16 is in the closed position. The mechanical system 26 cooperates with the sash 16 to move the sash 16 between the closed position (FIG. 3) and the various open positions (FIG. 1). In addition, each of the first sash wall 34 (FIG. 3), the second sash wall 36, the third sash wall 38 (FIG. 3) and the fourth sash wall 40 (FIG. 3) include a seal slot 76 defined on the respective one of the first sash wall 34, the second sash wall 36, the third sash wall 38 and the fourth sash wall 40 between the respective one of the first sash wall 34, the second sash wall 36, the third sash wall 38 and the fourth sash wall 40 and the frame 12. As shown in FIGS. 4A and 4B, the seal slot 76 defines a substantially T-shaped opening, which receives a portion of the first seal 30.

The first seal 30 is disposed about the sash 16 to inhibit fluids, debris, etc. from entering between the sash 16 and the frame 12 and may comprise a brush seal. In one example, with reference back to FIG. 3, the first seal 30 is composed of a plurality of first seal portions 80*a*-80*d*, which may be coupled together, via adhesives, thermal welding, etc., to form a substantially rectangular shape. Each of the first seal portions 80*a*-80*d* are received within the seal slot 76 of a respective one of the first sash wall 34, the second sash wall 36, the third sash wall 38 and the fourth sash wall 40. With reference to FIGS. 4A and 4B, each of the first seal portions 80*a*-80*d* is substantially wedge-shaped, and include a first seal end 82 opposite a second seal end 84. The first seal end 82 is substantially T-shaped, and is sized to be received within the respective seal slot 76. Generally, the first seal end 82 is slidably received within the respective seal slot 76. The second seal end 84 has a width that is different and greater than a width of the first seal end 82.

The frame 12 is coupled to the building 24 (FIG. 1), and supports the sash 16 and the glazing unit 14. The frame 12 includes a first frame member or sill 90 and a second frame member, access cover or operator access cover 92. Thus, the frame 12 is generally a two-part frame. The frame 12 also includes the mechanical system 26, which controls the movement of the sash 16 relative to the frame 12. In one example, with reference back to FIG. 3, the sill 90 is rectangular and includes a first sill wall 94 opposite a second sill wall 96, and a third sill wall 98 opposite a fourth sill wall 100. Each of the first sill wall 94, the second sill wall 96, the third sill wall 98 and the fourth sill wall 100 are composed of a polymer-based material, including, but not limited to polyvinyl chloride. In this example, each of the first sill wall 94, the second sill wall 96, the third sill wall 98 and the fourth sill wall 100 are extruded, and are coupled together, via suitable mechanical fasteners, such as screws, bolts, etc. and/or adhesives to form the rectangular sill 90 or first frame member. The first sill wall 94, the third sill wall 98 and the fourth sill wall 100 are each substantially the same, and cooperate to support the sash 16 and glazing unit 14. The second sill wall 96 cooperates with the operator access cover 92 to enable access to the mechanical system 26 and/or glazing unit 14.

With reference to FIGS. 4A and 4B, the second sill wall 96 includes a first sill wall end 102 opposite a second sill wall end 104. The first sill wall end 102 is disposed at the exterior side 20 of the building 24, and the second sill wall 96 is disposed at the interior side 22 of the building 24. The second sill wall 96 includes a first, inside surface 106 and an opposite second, outside surface 108. The second surface 108 is coupled to the building 24 (FIG. 2), and includes a flange 110 and a coupling channel 112. The flange 110 extends outwardly from the second surface 108, and contacts the exterior side 20 of the building 24 (FIG. 2) when the fenestration unit 10 is coupled to the building 24. The coupling channel 112 defines a pair of recesses 114 that are separated by a projection 116. Each of the pair of recesses 114 may receive a sealant, adhesive, etc. to couple the frame 12 to the building 24. In one example, each of the first sill wall 94, the second sill wall 96, the third sill wall 98 and the fourth sill wall 100 include the coupling channel 112 to assist in coupling the frame 12 to the building 24 (FIG. 2). The projection 116 is defined between the pair of recesses 114 and is substantially flush with the second surface 108.

The first surface 106 is spaced apart from and proximate the sash 16. The first surface 106 defines a seal stop 120, a linkage assembly interface 122, a mechanical system interface 124 and a cover coupling portion 126. A second seal 128 is also coupled to the first surface 106. Generally, the second seal 128 is coupled to the first surface 106 proximate the linkage assembly interface 122 to seal against a portion of the sash 16 when the sash 16 is in the closed position. In one example, the second seal 128 is coupled to a ramp surface 127 defined between the linkage assembly interface 122 and the mechanical system interface 124. A wall 129 extends upwardly from the first surface 106 and provides a contact surface for the second seal 128 on the frame 12. The second seal 128 may be composed of a polymeric material, including, but not limited to an elastomer. The second seal 128 may comprise a bulb seal, which is coupled to a slot **128*a* defined in the first surface 106. The second seal 128 assists in inhibiting the ingress of fluids, such as water, into the frame 12**.

The seal stop 120 is defined proximate the first sill wall end 102. In one example, the seal stop 120 is a ledge, which extends along the second sill wall 96 from the third sill wall 98 to the fourth sill wall 100. The seal stop 120 is configured to contact the first seal 30 and to cooperate with the first seal 30 to form a seal between the sash 16 and the frame 12. The linkage assembly interface 122 is defined on the first surface 106 between the seal stop 120 and the mechanical system interface 124. The linkage assembly interface 122 includes a second ledge 130 and at least one or a plurality of bores 132. The second ledge 130 is defined to extend axially along the second sill wall 96 and abuts the linkage assembly 68 when the linkage assembly 68 is coupled to the frame 12. The second ledge 130 also provides error proofing as the second ledge 130 provides a stop for the positioning linkage assembly 68 on the frame 12. The bores 132 are defined through the first surface 106. The bores 132 communicate with the hollow interior of the second sill wall 96 to enable at least one or a plurality of mechanical fasteners 134, such as screws, to be received into the second sill wall 96 to couple the linkage assembly 68 to the frame 12.

The mechanical system interface 124 is defined between the wall 129 and the cover coupling portion 126. The mechanical system interface 124 is substantially planar. In one example, the mechanical system interface 124 includes at least one or a plurality of bores 136. The bores 136 are defined through the first surface 106 and are in communication with the hollow interior of the second sill wall 96 to enable at least one or a plurality of mechanical fasteners 138, such as bolts, to be received into the second sill wall 96 to couple the mechanical system 26 to the frame 12. Generally, the mechanical system interface 124 is enclosed by the operator access cover 92, and a mechanical chamber 140 is defined between the mechanical system interface 124 and the operator access cover 92 to enable a portion or a majority of the mechanical system 26 to be positioned within and enclosed by the frame 12.

Figure 5:
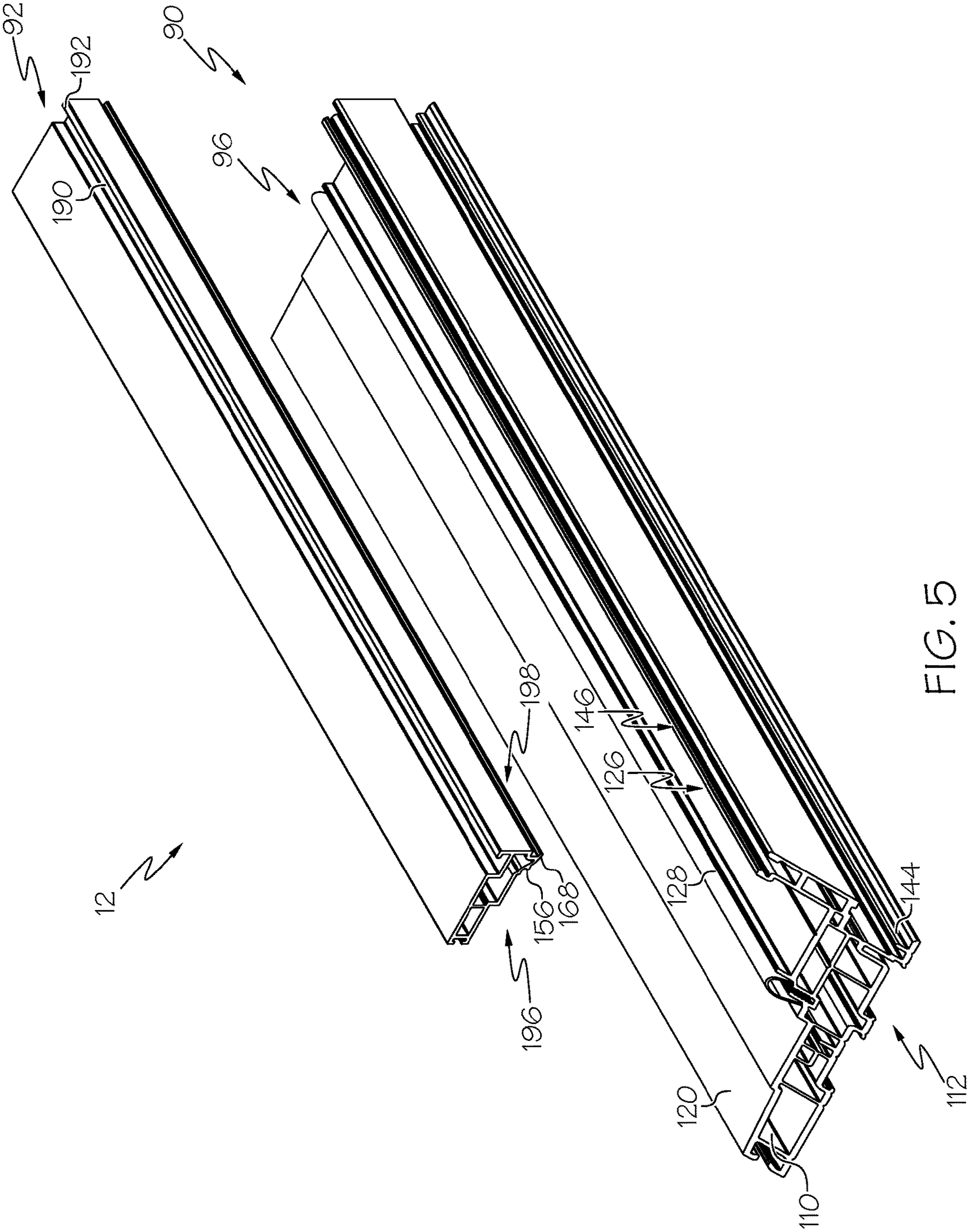
FIG. 5 is an exploded view of a portion of the two-part frame, which illustrates the operator access cover removed from the sill wall.

The cover coupling portion 126 extends upward from the first surface 106 along a first axis A substantially parallel to the longitudinal axis L. With reference to FIG. 5, the cover coupling portion 126 extends over a length of the second sill wall 96 from the third sill wall 98 to the fourth sill wall 100. The cover coupling portion 126 includes a first coupling end 144 integrally formed with the first surface 106 and an opposite second coupling end 146 to be coupled to the operator access cover 92. In this example, the cover coupling portion 126 is defined by a first coupling wall 148 and a second coupling wall 150 that is spaced apart from the first coupling wall 148. The second coupling wall 150 is coupled to the first coupling wall 148 via a strut 152. The first coupling wall 148 is interior of the second coupling wall 150 and extends upwardly from the first surface 106 proximate the mechanical system interface 124. The first coupling wall 148 is cantilevered from the strut 152, and is flexible to enable the operator access cover 92 to removably engage with the second sill wall 96. In one example, the first coupling wall 148 includes a slot 154 proximate the second coupling end 146, which is sized and shaped to receive a first tab 156 of the operator access cover 92. The first coupling wall 148 also includes a keyed rail 158 at the second coupling end 146. In one example, the keyed rail 158 includes a first ramp surface 160 and a second ramp surface 162. The first ramp surface 160 extends along an axis A1, and the second surface extends along an axis A2, which is different than the axis A1. In one example, the axis A1 is substantially transverse to the first axis A, and the axis A2 is substantially perpendicular to the first axis A. The keyed rail 158 is sized and shaped to be received in a corresponding notch 164 of the operator access cover 92.

The second coupling wall 150 is cantilevered from the strut 152, and is also flexible to enable the operator access cover 92 to removably engage with the second sill wall 96. The second coupling wall 150 includes a groove 166. The groove 166 is sized and shaped to receive a second tab 168 of the operator access cover 92. The second coupling wall 150 also includes a rail 170 at the second coupling end 146. In one example, the rail 170 is a projection, which extends inward, toward the first coupling wall 148. In one example, the rail 170 includes a planar surface **170*a* (FIGS. 6A and 6B) that cooperates with the second tab 168. The rail 170 is sized and shaped to engage with a groove 172 of the operator access cover 92. The groove 172** is generally C-shaped.

The operator access cover 92 is coupled to the second sill wall 96 via the cover coupling portion 126. The operator access cover 92 is composed of a polymeric material, including, but not limited to polyvinyl chloride, and is extruded. The operator access cover 92 is suspended over the mechanical chamber 140 by the cover coupling portion 126. The operator access cover 92 and the second sill wall 96 are coupled together so as to withstand at least 10 pound force per inch applied in the direction of the first axis A and force applied in a direction perpendicular to the first axis A. This ensures that the operator access cover 92 remains coupled to the second sill wall 96 in the event of a user resting on the operator access cover 92 to look through the glazing unit 14, for example. The operator access cover 92 includes a first cover end 180 and an opposite second cover end 182. The operator access cover 92 also includes a first cover surface 184 opposite a second cover surface 186. The first cover end 180 is disposed proximate the second stop 44. The first cover end 180 includes a third seal 188. The third seal 188 may be composed of a polymeric material, including, but not limited to an elastomer. The third seal 188 may comprise a bulb seal, which is coupled to a slot 188*a* defined in the first cover end 180. The third seal 188 assists in inhibiting the ingress of fluids, such as water, into the mechanical chamber 140. The second cover end 182 is aligned with the second sill wall end 104. The second cover end 182 includes a screen receiving channel 190 defined in the first cover surface 184. The screen receiving channel 190 is substantially rectangular, and is sized to receive the screen frame 32. The screen receiving channel 190 also includes a screen lip 192, which projects into the screen receiving channel 190 to assist in retaining the screen frame 32 within the screen receiving channel 190 and to provide a smooth surface for ease of cleaning.

The second cover end 182 also includes a frame coupling portion 194 defined on the second cover surface 186. The frame coupling portion 194 extends outwardly from the second cover surface 186 at the second cover end 182. The frame coupling portion 194 includes the first tab 156 and the notch 164 on a first, interior cover side 196. The first tab 156 extends along a third axis A3, which is oblique to the first axis A. In one example, the third axis A3 extends at an angle of about 40 degrees to about 45 degrees that is measured between the third axis A3 and the second axis A2. The notch 164 is defined proximate the first tab 156. The frame coupling portion 194 also includes the second tab 168 and the groove 172 defined on a second, exterior cover side 198, which is opposite the first cover side 196. The second tab 168 extends along a fourth axis A4, which is different than the third axis A3. The fourth axis A4 is oblique to the third axis A3 and the first axis A. In one example, the fourth axis A4 extends at an angle of about 17 degrees to about 22 degrees that is measured between the fourth axis A4 and the second axis A2. The groove 172 is defined proximate the second tab 168.

The mechanical system 26 is operable by a user to move the sash 16, and thus, the glazing unit 14, between the closed position (FIG. 2) and the various opened positions (FIG. 1). In one example, the mechanical system 26 includes a crank arm 200, which is rotatable by the user to move the sash 16. In this example, the crank arm 200 is rotatably coupled a lever 202, via engaging teeth for example, which is coupled to the sash 16. A rotation of the crank arm 200 drives the lever 202, which pivots the sash 16 relative to the frame 12.

With reference back to FIG. 3, the screen frame 32 is substantially rectangular, and cooperates to enclose and support the screen 18. In one example, the screen frame 32 is composed of a polymeric material, including, but not limited to polyvinyl chloride, and is extruded. The screen frame 32 is removably received within the screen receiving channel 190 of the frame 12 (FIGS. 4A and 4B) to couple the screen frame 32 and the screen 18 to the frame 12. The screen 18 is generally composed of a metal or metal alloy, and is coupled to the screen frame 32.

In one example, with reference to FIGS. 3, 4A and 4B, in order to assemble the fenestration unit 10, the screen 18 is coupled to the screen frame 32. With the sash walls 34-40 formed, the sash walls 34-40 are assembled to form the sash 16. The first seal 30 is coupled to the sash walls 36-40 by sliding onto the seal slot 76. The linkage assembly 68 is coupled to the second sash wall 36. With the sill walls 94-100 formed, the sill walls 94-100 are assembled to form the frame 12. The mechanical system 26 is coupled to the mechanical chamber 140, and the lever 202 is coupled to the sash 16. The sash 16 is coupled to the frame 12, via the pivot pins, for example. With the sash 16 coupled to the frame 12, the glazing unit 14 is coupled to the sash 16 by positioning the glazing unit 14 in the glazing unit channel 46. The second stop 44 is coupled to the sash 16 to secure the glazing unit 14 within the sash 16. Generally, the second stop 44 is pushed into the sash tab groove 54 until the projection 60 of the second stop 44 engages with the slot 64. With the operator access cover 92 formed, the operator access cover 92 is coupled to the frame 12. Generally, the operator access cover 92 is coupled to the second sill wall 96 by applying a force along the longitudinal axis L to press the frame coupling portion 194 into engagement with the cover coupling portion 126. Generally, the application of the force biases the first coupling wall 148 and the second coupling wall 150 outward or in a direction substantially transverse or oblique to the longitudinal axis L, which enables the slot 154 to receive the first tab 156 and the groove 166 to receive the second tab 168. The keyed rail 158 is received within the notch 164, and the rail 170 engages with the groove 172 to further couple the operator access cover 92 to the frame 12. The third seal 188 seals against the second stop 44. With the screen 18 coupled to the screen frame 32, the screen frame 32 is positioned within the screen receiving channel 190 to couple the screen 18 to the frame 12. The fenestration unit 10 may then be coupled to or installed on the building 24 (FIG. 2).

With the operator access cover 92 coupled to the frame 12, the operator access cover 92 is removable to enable service of the mechanical system 26 and/or the glazing unit 14 from the interior side 22 of the fenestration unit 10, which eliminates the need for ladders, scaffolding, etc. to service the glazing unit 14 from the exterior side 20. In order to service the glazing unit 14 and/or the mechanical system 26 with the fenestration unit 10 installed on the building 24, the screen frame 32, including the screen 18, is removed from the screen receiving channel 190.

Figure 6A:
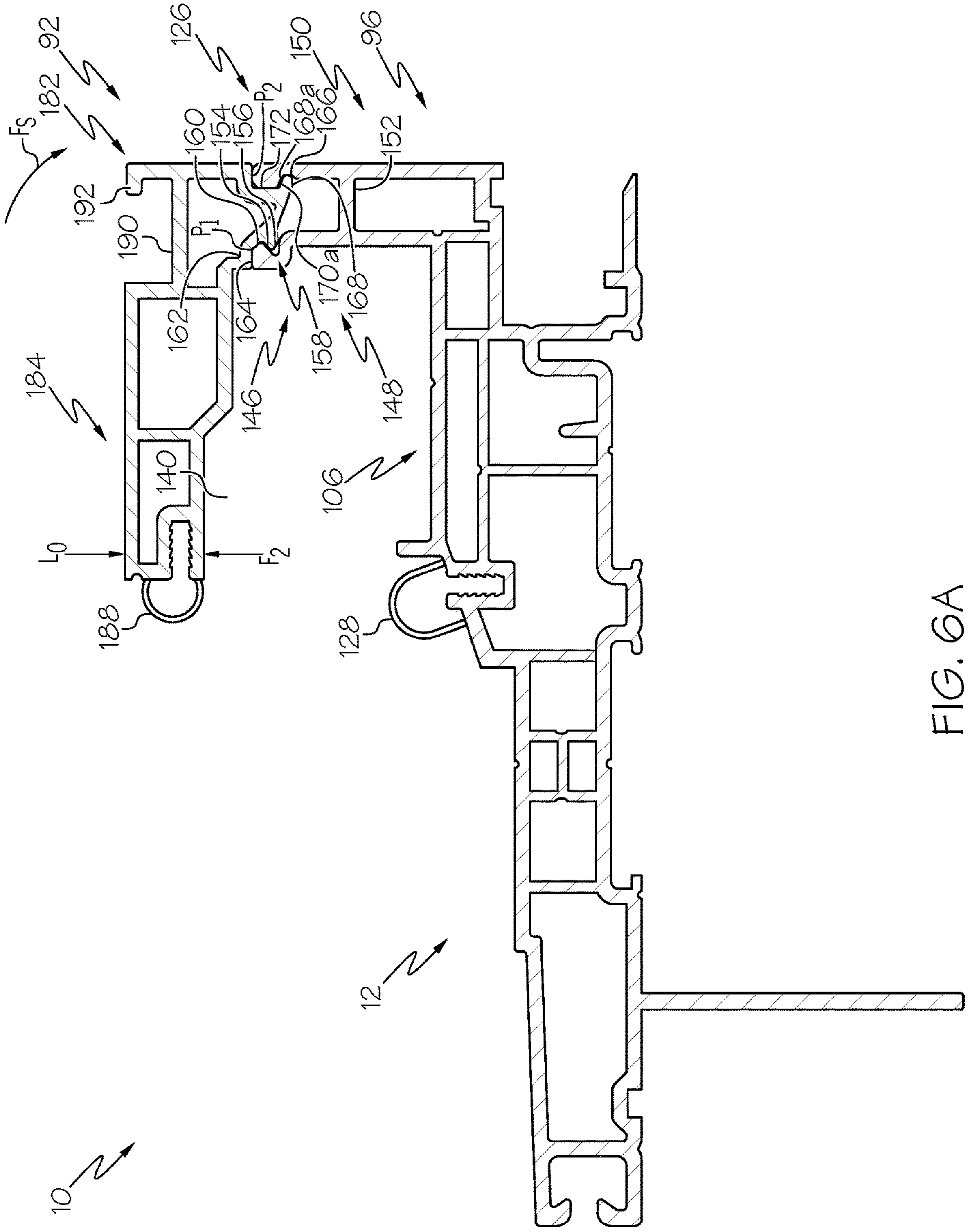
FIG. 6A is a cross-sectional view of the fenestration unit, taken along line 4-4 of FIG. 2, which illustrates the operator access cover coupled to the sill wall, and in which a mechanical system, a glazing unit and a sash associated with the fenestration unit are removed for clarity.
Figure 6B:
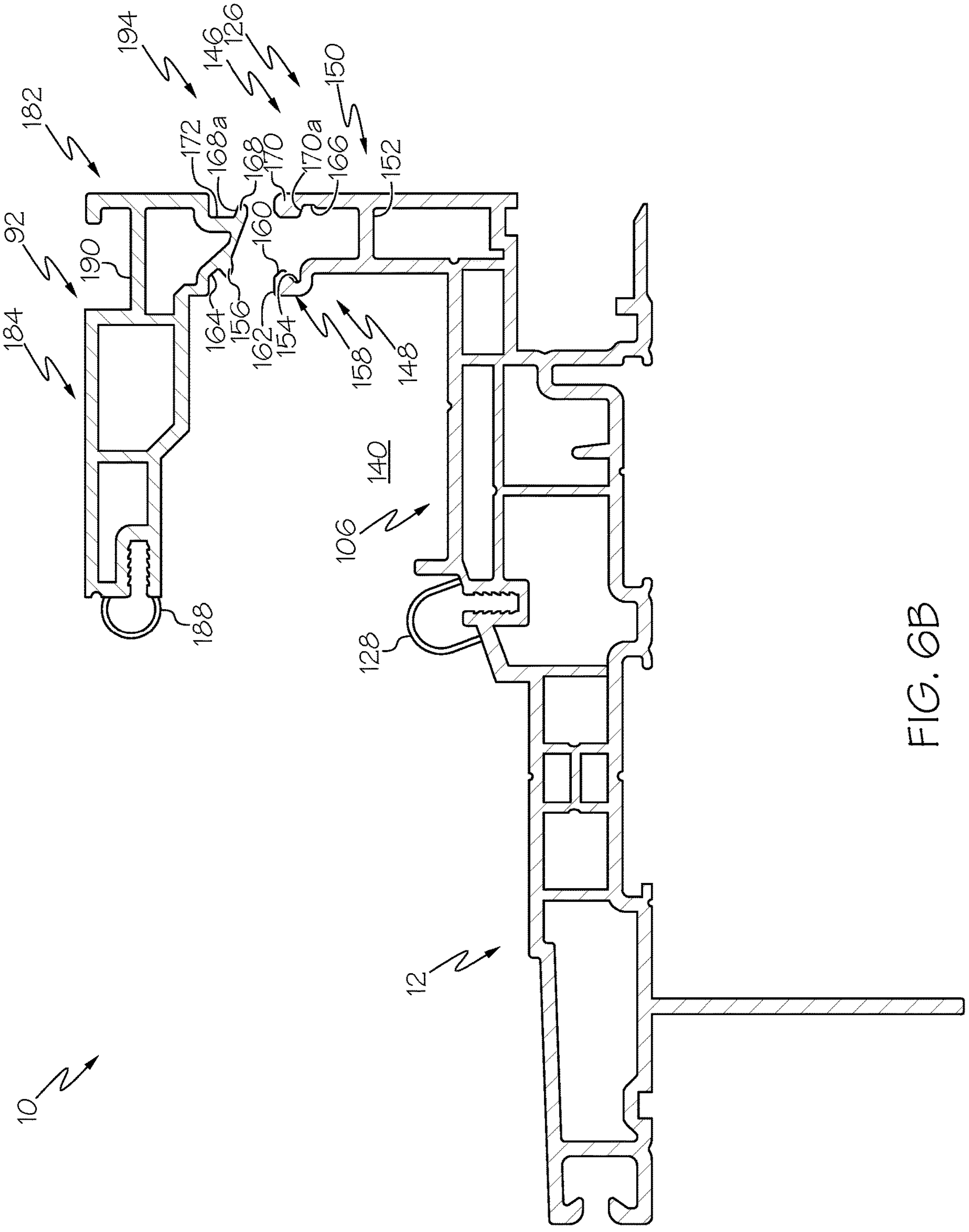
FIG. 6B is a cross-sectional view of the fenestration unit, taken from the perspective of line 4-4 of FIG. 2, which illustrates the operator access cover uncoupled from the sill wall, and in which the mechanical system, the glazing unit and the sash associated with the fenestration unit are removed for clarity.

With reference to FIG. 6A, a service technician may apply a torque Fs to the operator access cover 92 clockwise toward the interior side 22 to the screen lip 192 of the screen receiving channel 190 to rotate the operator access cover 92 relative to the second sill wall 96. In FIG. 6A, the mechanical system 26, the sash 16 and the glazing unit 14 are removed for clarity. The rotation of the operator access cover 92 causes the disengagement of the rail 170 with the groove 172 and the disengagement of the second tab 168 with the groove 166. In this regard, when a load is applied by the service technician to the second cover end 182 of the operator access cover 92, a rotation is created at a pivot point P1. As the operator access cover 92 rotates at pivot point P1, the first coupling wall 148 flexes and releases the keyed rail 158 with the notch 164 and the first tab 156 from the slot 154, thereby releasing the operator access cover 92 from the frame 12, as shown in FIG. 6B. In one example, the torque Fs to remove the operator access cover 92 is equivalent to the application of a force F2 of about 3.5 pound force per inch to the second cover surface 186 of the operator access cover 92 at the first cover end 180. With the operator access cover 92 removed, as shown in FIG. 6B, the service technician may service the mechanical system 26. In FIG. 6B, the mechanical system 26, the sash 16 and the glazing unit 14 are removed for clarity. Further, with brief reference to FIGS. 4A and 4B, with the operator access cover 92 removed, the service technician may rotate the second stop 44 counterclockwise or toward the glazing unit 14 to disengage the second stop 44 from the sash 16, thereby enabling the service technician to service the glazing unit 14.

In addition, with reference back to FIG. 6A, in the event of a load Lo being applied to the first cover surface 184 of the operator access cover 92 by an operator resting on the operator access cover 93, for example, a rotation is created at a pivot point P2. As the second tab 168 has a planar surface 168*a* that is in contact with the planar surface 170*a* of the rail 170 when the operator access cover 92 is coupled to the frame 12, the second tab 168 and the rail 170 inhibit or prevent the operator access cover 92 from uncoupling or disengaging from the frame 12. In one example, the operator access cover 92 remains coupled to the frame 12 during the application of the load Lo up to at least about 10 pound force per inch.

Figure 7:
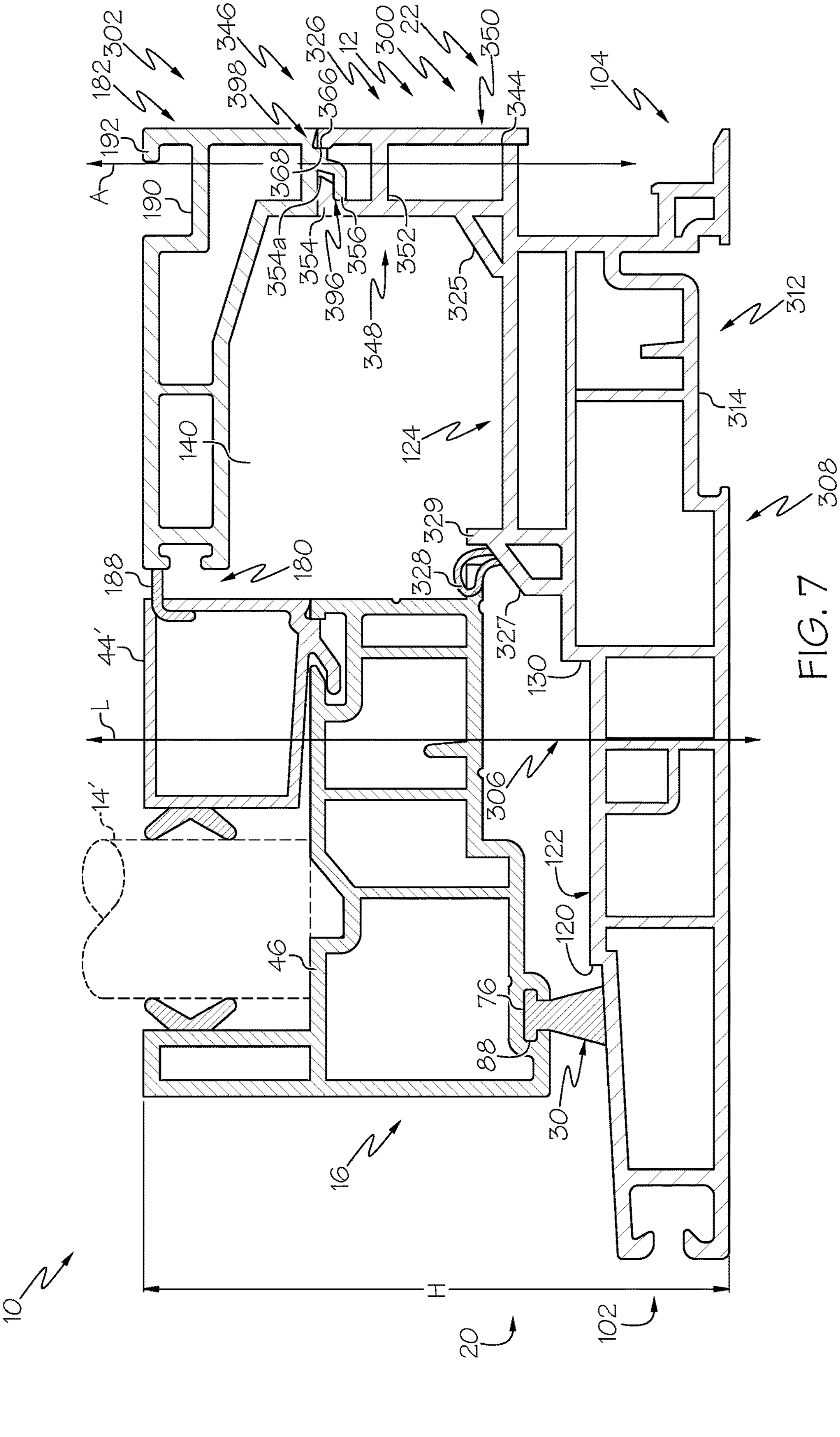
FIG. 7 is a cross-sectional view of another exemplary operator access cover and sill wall for the two-part frame of the fenestration unit, taken from the perspective of line 4-4 in FIG. 2.

It should be noted that in other embodiments, the second sill wall 96 and the operator access cover 92 may be configured differently for use with the frame 12 to enable access to the glazing unit 14 and/or mechanical system 26 of the fenestration unit 10. For example, with reference to FIG. 7, a second sill wall 300 and an access cover or operator access cover 302 is shown. As the second sill wall 300 and an operator access cover 302 include components that are the same or similar to components of the second sill wall 96 and the operator access cover 92 discussed with regard to FIGS. 1-6B, the same reference numerals will be used to denote the same or similar components. FIG. 7 is a cross-sectional view through the second sill wall 300 and the operator access cover 302 taken from the perspective of line 4-4 of FIG. 2. In this example, the second stop 44' is wider to accommodate a thinner glazing unit 14'.

The second sill wall 300 includes the first sill wall end 102 opposite the second sill wall end 104. The second sill wall 300 includes a first, inside surface 306 and an opposite second, outside surface 308. The second surface 308 is coupled to the building 24 (FIG. 2), and includes a coupling channel 312. The coupling channel 312 defines a recess 314. Each recess 314 may receive a sealant, adhesive, etc. to couple the frame 12 to the building 24 (FIG. 2). The first surface 306 is spaced apart from and proximate the sash 16. The first surface 306 defines the seal stop 120, the linkage assembly interface 322, the mechanical system interface 124 and a cover coupling portion 326. The first surface 306 may also include reinforcement rib 325 coupled between the mechanical system interface 124 and the cover coupling portion 326. A second seal 328 is also coupled to the first surface 306. Generally, the second seal 328 is coupled to the first surface 306 proximate the linkage assembly interface 122 to seal against a portion of the sash 16 when the sash 16 is in the closed position. In one example, the second seal 328 is coupled to a ramp surface 327 defined between the linkage assembly interface 122 and the mechanical system interface 124. A wall 329 extends upwardly from the first surface 306 and provides a contact surface for the second seal 128 on the frame 12. The second seal 328 may be composed of a polymeric material, including, but not limited to an elastomer. The second seal 328 assists in inhibiting the ingress of fluids, such as water, into the frame 12.

The mechanical system interface 124 is enclosed by the operator access cover 302, and the mechanical chamber 140 is defined between the mechanical system interface 124 and the operator access cover 302 to enable a portion or a majority of the mechanical system 26 to be positioned within and enclosed by the frame 12. The cover coupling portion 326 extends upward from the first surface 306 along the first axis A substantially parallel to the longitudinal axis L. The cover coupling portion 326 includes a first coupling end 344 integrally formed with the first surface 306 and an opposite second coupling end 346 to be coupled to the operator access cover 302. In this example, the cover coupling portion 326 is defined by a first coupling wall 348 and a second coupling wall 350 that is spaced apart from the first coupling wall 348. The second coupling wall 350 is coupled to the first coupling wall 348 via a strut 352. The first coupling wall 348 is interior of the second coupling wall 350 and extends upwardly from the first surface 306 proximate the mechanical system interface 124. The first coupling wall 348 is cantilevered from the strut 352, and is flexible to enable the operator access cover 302 to removably engage with the second sill wall 300. In one example, the first coupling wall 348 includes a projection 354 at the second coupling end 346, which extends from the first coupling wall 348 in a direction toward the second coupling wall 350. The projection 354 is sized and shaped to enable a tab 356 of the operator access cover 302 to be positioned beneath and retained by the projection 354 to secure the operator access cover 302 to the frame 12. The projection 354 may include a ramp surface 354*a* to assist in the disengagement of the tab 356 with the projection 354. The second coupling wall 350 is cantilevered from the strut 352, and is also flexible to enable the operator access cover 302 to removably engage with the second sill wall 300. The second coupling wall 350 includes a lip 366. The lip 366 projects inwardly from the second coupling wall 150 at the second coupling end 346, and is sized and shaped to contact a surface 368 of the operator access cover 302.

The operator access cover 302 is coupled to the second sill wall 300 via the cover coupling portion 326. The operator access cover 302 is composed of a polymeric material, including, but not limited to polyvinyl chloride, and is extruded. The operator access cover 302 is suspended over the mechanical chamber 140 by the cover coupling portion 326. The operator access cover 302 includes the first cover end 180 and the opposite second cover end 182. The operator access cover 302 also includes the first cover surface 184 opposite a second cover surface 386. The first cover end 180 is disposed proximate the second stop 44'. The second cover end 182 also includes a frame coupling portion 394 defined on the second cover surface 386. The frame coupling portion 394 extends outwardly from the second cover surface 386 at the second cover end 382. The frame coupling portion 394 includes the tab 356 on a first, interior cover side 396. The frame coupling portion 394 also includes the surface 368 defined on a second, exterior cover side 398, which is opposite the first cover side 396.

Generally, in order to couple the operator access cover 302 to the second sill wall 300, in one example, the operator access cover 302 is rotated clockwise to engage the tab 356 with the projection 354. Once the projection 354 is engaged with the tab 356, the operator access cover 302 is rotated counterclockwise to enclose the mechanical chamber 140 and engage the surface 368 with the lip 366. With the operator access cover 302 coupled to the frame 12, the operator access cover 302 is removable to enable service of the mechanical system 26 and/or the glazing unit 14' from the interior side 22 of the fenestration unit 10, which eliminates the need for ladders, scaffolding, etc. to service the glazing unit 14' from the exterior side 20. In order to service the glazing unit 14' and/or the mechanical system 26, a service technician may apply a force counterclockwise to the screen lip 192 of the screen receiving channel 190 to rotate the operator access cover 302 relative to the second sill wall 300. The rotation of the operator access cover 92 causes the disengagement of the tab 356 with the projection 354 and the disengagement of the surface 368 with the lip 366, thereby releasing the operator access cover 302 from the second sill wall 300. With the operator access cover 302 removed, the service technician may rotate the second stop 44' counterclockwise or toward the glazing unit 14' to disengage the second stop 44' from the sash 16, thereby enabling the service technician to service the glazing unit 14'.

Figure 8:
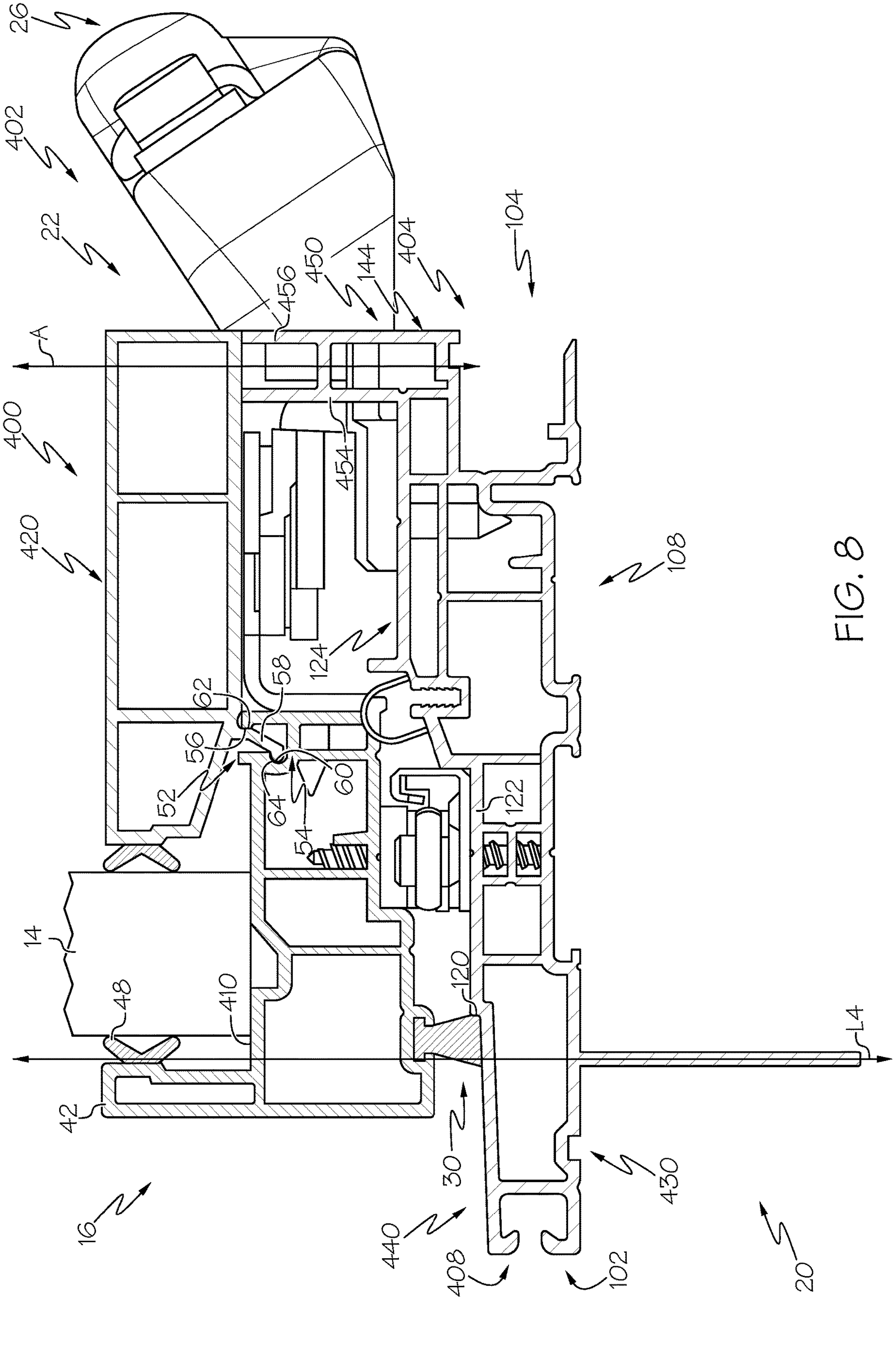
FIG. 8 is a cross-sectional view of another exemplary operator access cover and sill wall for a two-part frame of a fenestration unit, taken from the perspective of line 4-4 in FIG. 2.

It should be noted that in other embodiments, the operator access cover 92 may be configured differently for use with second sill wall 96 to enable access to the glazing unit 14 and/or mechanical system 26 of the fenestration unit 10. For example, with reference to FIG. 8, an access cover or operator access cover 400 for use a fenestration unit 402 is shown. As the fenestration unit 402 includes components that are the same or similar to components of the fenestration unit 10 discussed with regard to FIGS. 1-6B, the same reference numerals will be used to denote the same or similar components. FIG. 8 is a cross-sectional view through a second sill wall 404 and the operator access cover 400 taken from the perspective of line 4-4 of FIG. 2. In this example, the fenestration unit 402 includes the sash 16, the glazing unit 14, the first seal 30 and a frame 408.

In one example, the first stop 42 of the sash 16 cooperates with the operator access cover 400 to define a glazing unit channel 410. The first stop 42 is integrally formed with a first side of the glazing unit channel 410, and the operator access cover 400 is coupled to the sash 406 to form a second stop for the glazing unit 14. The glazing unit channel 410 is configured to receive the glazing unit 14 and to retain the glazing unit 14 within the sash 16.

Generally, the operator access cover 400 is coupled to the sash 16 to enable the glazing unit 14 to be removed, for repair, for example, without removing the entirety of the fenestration unit 402. The operator access cover 400 is composed of a polymeric material, including, but not limited to polyvinyl chloride, and is extruded. The operator access cover 400 includes a body portion 420 and the interlocking stop tab 52. The body portion 420 is generally elongate and hollow, and is integrally formed with the interlocking stop tab 52. The interlocking stop tab 52 is cantilevered or extends outwardly from the body portion 420, and is received within the sash tab groove 54 of the sash 16. The interlocking stop tab 52 includes the first contact surface 56, the ramp surface 58 and the second contact surface or projection 60. The first contact surface 56 is defined on the interlocking stop tab 52 proximate the body portion 50, and is coupled to or in contact with the lip 62 of the sash tab groove 54. The ramp surface 58 extends from the first contact surface 56 to the projection 60. The ramp surface 58 extends along an axis oblique to a longitudinal axis L4 of the fenestration unit 402, and biases the interlocking stop tab 52 within the sash tab groove 54. The projection 60 engages with the slot 64 of the sash tab groove 54 to couple the operator access cover 400 to the sash 16. Generally, in order to remove the operator access cover 400 to access the glazing unit 14, the operator access cover 400 is moved counterclockwise toward the glazing unit 14 to release the ramp surface 58 and thereby disengage the projection 60 with the slot 64, and the first contact surface 56 with the lip 62.

In one example, the second glazing unit sealing member 66 is coupled to the body portion 420 of the operator access cover 400 and contacts the glazing unit 14 when the operator access cover 400 is coupled to the sash 16. The second glazing unit sealing member 66 assists in inhibiting fluids, such as water, etc., from entering into the glazing unit channel 410.

The frame 408 supports the sash 16 and the glazing unit 14. The frame 408 includes a first frame member or sill 430 and a second frame member, access cover or operator access cover 400. Thus, the frame 408 is generally a two-part frame. The frame 408 also includes the mechanical system 26, which controls the movement of the sash 16 relative to the frame 408. In one example, the sill 430 is rectangular and includes the first sill wall 94 opposite a second sill wall 404, and the third sill wall 98 opposite the fourth sill wall 100 (FIG. 3). The second sill wall 404 is composed of a polymer-based material, including, but not limited to polyvinyl chloride. The second sill wall 404 is extruded, and is coupled with the first sill wall 94, the third sill wall 98 and the fourth sill wall 100 via suitable mechanical fasteners, such as screws, bolts, etc. and/or adhesives to form the rectangular sill 430 or first frame member. The second sill wall 404 cooperates with the operator access cover 400 to enable access to the mechanical system 26 and/or glazing unit 14.

In this example, the second sill wall 96 includes the first sill wall end 102 opposite the second sill wall end 104. The second sill wall 96 includes a first, inside surface 440 and the opposite second, outside surface 108. The first surface 440 is spaced apart from and proximate the sash 16. The first surface 440 defines the seal stop 120, the linkage assembly interface 122, the mechanical system interface 124 and a cover coupling portion 450. The cover coupling portion 450 extends upward from the first surface 440 along the first axis A substantially parallel to the longitudinal axis L4. The cover coupling portion 450 includes the first coupling end 144 integrally formed with the first surface 440 and an opposite second coupling end 452 to be coupled or positioned adjacent to the operator access cover 400. In this example, the cover coupling portion 126 is defined by a first coupling wall 454 and a second coupling wall 456 that is spaced apart from the first coupling wall 454. The second coupling wall 456 is coupled to the first coupling wall 454 via the strut 152. The first coupling wall 454 is interior of the second coupling wall 456 and extends upwardly from the first surface 440 proximate the mechanical system interface 124. The cover coupling portion 450 is generally configured to support the operator access cover 400 so as to enclose a portion of the mechanical system 26.

Generally, in order to couple the operator access cover 400 to the sash 16, in one example, the interlocking stop tab 52 defined on the body portion 420 of the operator access cover 400 is pushed into the sash tab groove 54 until the projection 60 of the second stop 44 engages with the slot 64. With the operator access cover 400 coupled to the sash 16, the operator access cover 400 is removable to enable service of the mechanical system 26 and/or the glazing unit 14 from the interior side 22 of the fenestration unit 402, which eliminates the need for ladders, scaffolding, etc. to service the glazing unit 14 from the exterior side 20. In order to service the glazing unit 14 and/or the mechanical system 26 with the fenestration unit 402 installed on the building 24, the operator access cover 400 is rotated counterclockwise, toward the glazing unit 14, to disengage the interlocking stop tab 52 from the sash 16, thereby enabling the service technician to service the glazing unit 14.

Thus, the second sill wall 96, 300, 404 and the operator access cover 92, 302, 400 enable access to the mechanical system 26 and/or the glazing unit 14, 14' from the interior side 22, without requiring the use of ladders, scaffolding, etc.

to access the glazing unit 14, 14' from the exterior side 20, which reduces service cost and time. Moreover, by enabling access to the mechanical system 26 and/or glazing unit 14, 14' from the interior side 22, the second sill wall 96, 300, 404 and the operator access cover 92, 302, 400 or the two-part frame 12, 408 enables the mechanical system 26 and/or the glazing unit 14, 14' to be repaired without requiring removal of the sash 16. Further, the second sill wall 96, 300, 404 and the operator access cover 92, 302, 400 of the two-part frame 12, 408 enable the mechanical system 26 to be serviced without removing the glazing unit 14, 14'. Thus, the two-part frame 12, 408, which includes the second sill wall 96, 300, 404 and the operator access cover 92, 302, 400, reduces service complexity, and provides for ease of servicing of the mechanical system 26 and/or the glazing unit 14, 14' when the fenestration unit 10, 402 is installed on the building 24 (FIG. 2). In addition, it should be noted that the second sill wall 96, 300, 404 and the operator access cover 92, 302, 400 cooperate to provide the two-part frame 12, 408 with a profile height H of about 57 millimeters (mm) to about 62 millimeters (mm), which is an about 25% reduction in profile height H when compared to a two-part frame of a fenestration unit having a profile height of about 77 millimeters (mm) to about 85 millimeters (mm). The low profile height H of the two-part frame 12, 408 enables the glazing unit 14, 14' to have a larger surface area, which enables the fenestration unit 10, 402 to have a 0.14 British Thermal Unit (BTU) factor when the glazing unit 14, 14' is a tri-pane glazing unit. Thus, the second sill wall 96, 300, 404 and the operator access cover 92, 302, 400 of the two-part frame 12, 408 also enable the fenestration unit 10, 402 to have a higher energy performance rating.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A fenestration unit, comprising:

a sash configured to receive a glazing unit;

a frame including:

a plurality of walls configured to support the sash, a first wall of the plurality of walls including a cover coupling portion having a first cantilevered coupling wall spaced apart from a second cantilevered coupling wall, the first cantilevered coupling wall comprising a keyed rail at an end; and an access cover defining a first tab opposite a second tab, the first tab configured to releasably engage with the first cantilevered coupling wall and the second tab configured to releasably engage with the second cantilevered coupling wall, the keyed rail configured to engage with a notch defined on the access cover proximate the first tab.

2. The fenestration unit of claim 1, wherein the second cantilevered coupling wall further comprises a second rail at a second end thereof, which is configured to engage with a groove defined on the access cover proximate the second tab.

3. The fenestration unit of claim 1, wherein the access cover defines at least one channel configured to receive a screen assembly associated with the fenestration unit.

4. The fenestration unit of claim 1, wherein the sash includes a first stop and a second stop that is removably attached to the first stop, the first stop defining a first side of a channel and the second stop defining a second side of the channel, the glazing unit received in the channel.

5. The fenestration unit of claim 4, wherein the access cover further comprises a seal positioned between the second stop and the access cover.

6. The fenestration unit of claim 1, wherein the fenestration unit is a casement window.

7. The fenestration unit of claim 1, wherein the cover coupling portion extends along a first axis and the first tab extends along a second axis, which is oblique to the first axis.

8. The fenestration unit of claim 1, wherein the access cover cooperates with the first wall to define a chamber configured to receive a mechanical system configured for moveably supporting the sash relative to the frame.

* * * * *